United States Patent
Shibata

(10) Patent No.: US 6,653,646 B1
(45) Date of Patent: Nov. 25, 2003

(54) MATERIAL ACTIVATING METHOD AND DEVICE FOR CARRYING OUT THE SAME

(75) Inventor: Kazuhito Shibata, Shinagawa-Ku (JP)

(73) Assignee: W.F.N. Co., Ltd., Tokyo-To (JP)

( * ) Notice: Subject to any disclaimer, the term of this patent is extended or adjusted under 35 U.S.C. 154(b) by 0 days.

(21) Appl. No.: 09/600,224

(22) PCT Filed: Sep. 17, 1999

(86) PCT No.: PCT/JP99/05082
§ 371 (c)(1),
(2), (4) Date: Jul. 12, 2000

(87) PCT Pub. No.: WO00/30124
PCT Pub. Date: May 25, 2000

(30) Foreign Application Priority Data

Nov. 13, 1998 (JP) .......................... 10-323833

(51) Int. Cl.⁷ .................. F02B 51/00; F02B 25/06; F02M 27/00; G21F 5/02; G01N 23/00

(52) U.S. Cl. ............... 250/497.1; 250/432 R; 250/455.11; 123/536; 123/539; 123/573

(58) Field of Search .................. 123/536, 539, 123/573; 250/431, 432 R, 455.11, 497.1

(56) References Cited

U.S. PATENT DOCUMENTS

| | | | |
|---|---|---|---|
| 2,992,980 A | 7/1961 | Suttle, Jr. | |
| 3,414,499 A | 12/1968 | Gardner et al. | |
| 3,678,908 A | 7/1972 | Ito ........................ | 123/119 E |
| 5,111,797 A | * 5/1992 | Shikanai ................ | 123/537 |
| 5,941,219 A | * 8/1999 | Takebe .................. | 123/536 |

FOREIGN PATENT DOCUMENTS

| | | |
|---|---|---|
| FR | 824018 | 1/1938 |
| FR | 1 536 927 | 9/1968 |
| GB | 349175 | 5/1931 |
| GB | 749513 | 5/1956 |
| GB | 2 282 478 | 4/1995 |
| JP | 59-8965 | 1/1984 |
| JP | 59150932 | * 8/1984 |
| JP | 61-293463 | 12/1986 |
| JP | 5-99084 | 4/1993 |
| JP | 7-19128 | 1/1995 |
| JP | 7-42635 | 2/1995 |
| JP | 8-218955 | 8/1996 |
| JP | 08-218955 | * 8/1996 |
| JP | 8-218956 | 8/1996 |
| JP | 10-110655 | 4/1998 |

OTHER PUBLICATIONS

Abstract of JP10–110655, *Patent Abstracts of Japan*, vol. 1998, No. 9, Jul. 31, 1998.

* cited by examiner

*Primary Examiner*—John R. Lee
*Assistant Examiner*—Kalimah Fernandez
(74) *Attorney, Agent, or Firm*—Ladas & Parry

(57) ABSTRACT

A material activating device (10) comprises a radioactive layer (11) of a radioactive means that generates radioactive rays for irradiating a material to be activated, and conductive metal layers (12,13) disposed on one side of the radioactive layer (11) and interposed between the radioactive layer (11) and the material to be activated. Radioactive rays emitted by the radioactive means ionizes the material, and the conductive metal layers are charged with electric charges generated when the material is ionized. The conductive metal layers create an electric field and a magnetic field. The material can very efficiently be activated by interaction between the electric and the magnetic field, and the ionized material.

6 Claims, 4 Drawing Sheets

MATERIAL ACTIVATING METHOD AND DEVICE FOR CARRYING OUT THE SAME

TECHNICAL FIELD

The present invention relates to a material activating device and, more specifically, to an improved material activating device provided with a conductive metal layer interposed between a material to be activated and a layer of a radioactive means to activate the material efficiently.

BACKGROUND ART

Various technique have been proposed to improve combustion efficiency by irradiating intake air for an internal combustion engine for activation.

For example, an invention relating to "a carburetor with ionizing element provided with an ionizing element containing a radioactive material that radiates low-level α-rays, β-rays or the like and disposed in a pipe in which air and fuel to be supplied to an engine is mixed" is disclosed in JP-A No. Sho 52-131024.

As shown in FIG. 6, according to this invention, a body member 1 of a carburetor is lined with an annular ionizing element 2 of a nonabsorptive synthetic resin containing a radioactive material, and is coated with a radiation-protective layer 3.

The ionizing element 2 has a pleated contact surface 4 with which intake air comes into contact the pleated contact surface 4 has a large contact area.

An invention disclosed in JP-A No. Sho 53-16118 lines an intake duct for an engine with a coating layer that radiates radioactive rays, such as α-rays, β-rays or γ-rays.

A technique disclosed also in JP-A No. Sho 53-16118 suspends a 0.3 mm×10 mm×10 mm ionizing foil 7 of tritium having an radioactivity of 100 mCi by a suspension wire 8 inside an air cleaner disposed inside an intake duct 5 as shown in FIG. 7.

All those known techniques place a radioactive material in the intake duct of the engine to activate intake air for the engine by bringing intake air into direct contact with the radioactive material.

Contact time for which intake air is in contact with the ionizing element 2 or the ionizing foil 7 changes in inverse proportion to engine speed; the contact time decreases with the increase of engine speed.

Consequently, the known techniques are able to activate intake air for an engine slightly by the radioactive material and could not have exercise significant effects.

Furthermore, since those known techniques place the ionizing element 2 or the ionizing foil 7 in the intake duct of the engine, the ionizing element 2 or the ionizing foil 7 exerts resistance against the flow of intake air, and reduces the output of the engine instead of increasing the same.

If the ionizing element 2 or the ionizing foil 7 is disposed in the exhaust pipe of the engine and is exposed directly to the exhaust gas from the engine, the ionizing element 2 or the ionizing foil 7 is damaged by the heat of the exhaust gas.

Accordingly, the prior art material activating device cannot be used for the activation of the exhaust gas from an engine.

It is an object of the present invention to solve the foregoing problems in the prior art and to provide a material activating device capable of very efficiently activating materials, such as intake air taken in by an engine for combustion or the exhaust gas produced by combustion in an engine and discharged from the engine.

DISCLOSURE OF THE INVENTION

A material activating method stated in accordance with the present invention stated in claim 1 is characterized in interposing a conductive metal layer between a material to be activated and a layer of a radioactive means that generates radioactive rays for activating the material.

The present invention has been made on the basis of a knowledge acquired by the inventors of the present invention that "the activating effect of radioactive rays is enhanced significantly by a conductive metal layer interposed between a material to be activated and a layer of a radioactive means."

Further studies are necessary to explain clearly why the effect of radioactive rays is enhanced by such an arrangement. It is considered so far that the conductive metal layer is charged with charges produced when a material is ionized by irradiation with radioactive rays, the charged conductive metal layer creates an electric field and a magnetic field, and the electric field, the magnetic field and the ionized material interact to cause such a phenomenon.

It is known that the greater the specific gravity of the metal layer, the higher is the level of activation of the material.

Experiments proved that the activation of intake air for an automotive engine and the exhaust gas from the automotive engine by the material activating device of the present invention reduces the fuel consumption of the automotive engine by about 40% and reduces the carbon dioxide concentration of the exhaust gas from the automotive engine by 20% at the maximum when an automobile equipped with the automotive engine travels at a high traveling speed of 100 km/h.

According to the present invention, the conductive metal layer is interposed between the material to be activated and the radioactive means. When the intake duct or the exhaust pipe of the engine is used as the conductive metal layer, the radioactive means can be disposed outside the intake duct or the exhaust pipe of the engine.

Consequently, there is no possibility that the radioactive means exerts resistance on the flow of intake air for the engine or the radioactive means is damaged by the hot exhaust gas from the engine.

A material activating device stated in claim 20 comprises a layer of a radioactive means that generates radioactive rays for irradiating a material to be activated, and a conductive metal layer disposed on one side of the layer of the radioactive means so as to be interposed between the layer of the radioactive means and the material.

The conductive metal layer may be a partition wall separating the material and the layer of the radioactive means from each other or a wall defining a flow passage through which the material flows.

Generally, the intake duct, the exhaust pipe or the cylinder block, for example, of an automotive engine is formed of a conductive metal, such as steel or aluminum.

Accordingly, the material flowing along one side of the metal member can efficiently be activated by holding the radioactive means on the other surface of the metal member.

The layer of the radioactive means may be held on the holding member attached to the conductive metal layer to hold the layer of the radioactive means on the conductive metal layer.

Preferably, the holding member is formed of a conductive metal.

A material activating device stated in claim 25 comprises a conductive metal plate capable of being wrapped around a conduit through which a material to be activated flows, and a layer of a radioactive means that generates radioactive rays for irradiating the material, formed on one surface of the metal plate, wherein the conductive metal plate forms a conductive metal layer between the material and the layer of the radioactive means when the same is wrapped around the conduit.

Even if the conduit through which intake air flows, such as the intake duct of an automobile, is formed of a nonmetallic material, such as a polymer, the layer of the conductive metal can be formed around intake air for combustion to be activated by wrapping the material activating device around the conduit and the layer of the radioactive means can fixedly be formed on the outer side of the metal layer.

Although the present invention may use monazite powder as the radioactive means, any legally permitted radioactive substance may be employed.

BEST MODE FOR CARRYING OUT THE INVENTION

Material activating devices in preferred embodiments according to the present invention will be described with reference to FIGS. 1 to 5.

First Embodiment

A material activating device in a first embodiment according to the present invention will be described with reference to FIGS. 1 to 3.

Figure 1:
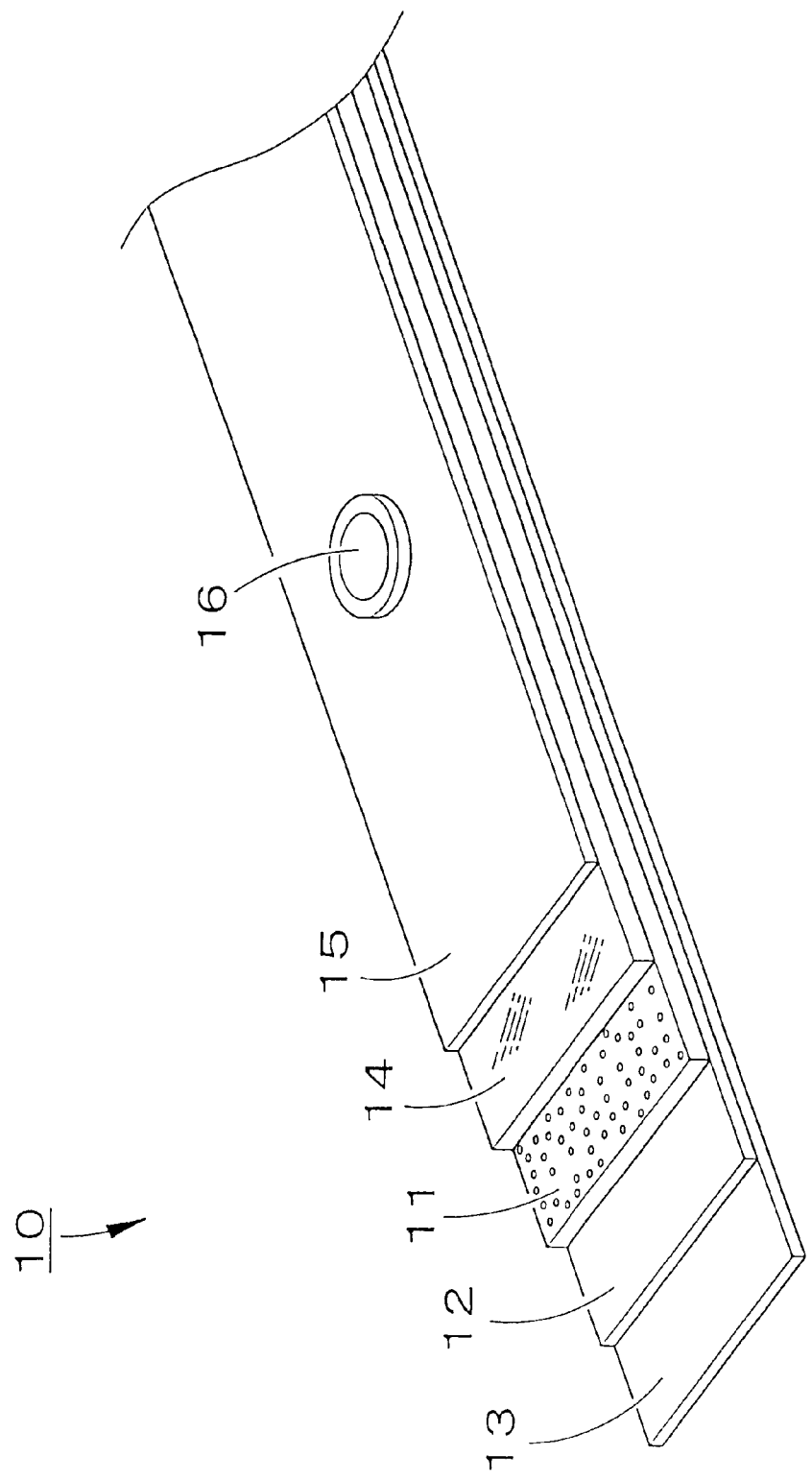
FIG. 1 is a perspective view of a material activating device in a first embodiment according to the present invention.

Referring to FIG. 1, a material activating device 10 in the first embodiment is a laminated structure formed by laminating a radioactive layer 11 of a radioactive substance, i.e., a radioactive means, and metal strips.

The radioactive layer 11 is a strip of a synthetic resin that does not absorb radioactive rays, containing monazite powder.

Copper strips 12 and 13, i.e., conductive metal strips, underlie the radioactive layer 11.

A lead strip 14 overlies the radioactive layer 11 to intercept radioactive rays. A copper strip 15 similar to the copper strips 12 and 13 overlies the lead strip 14.

The radioactive layer 11, the copper strips 12 and 13, the lead strip 14 and the copper strip 15 are combined together with a rivet 16 so as to be movable relative to each other.

Figure 2:
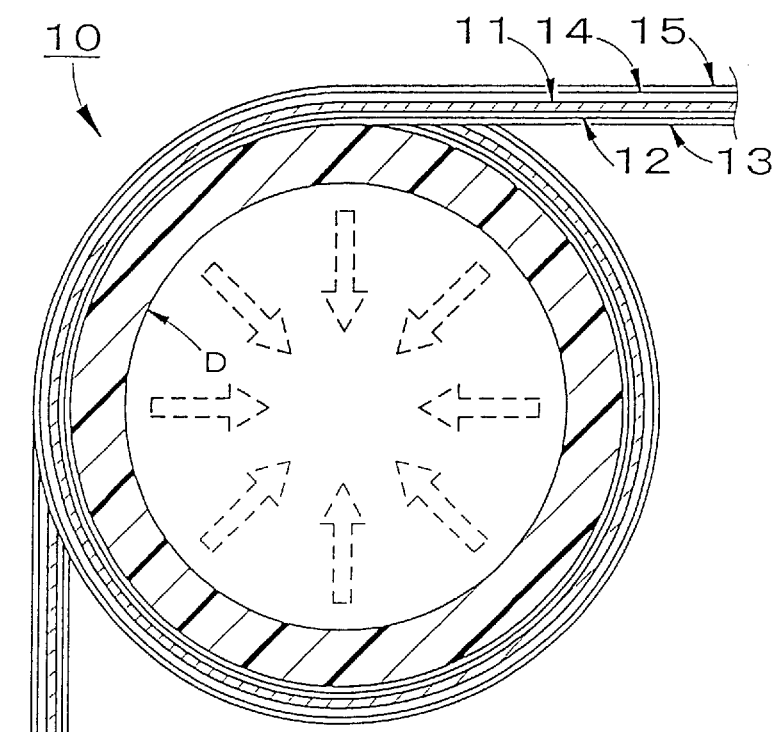
FIG. 2 is a sectional view of the material activating device of FIG. 1 wrapped around a duct.
Figure 3:
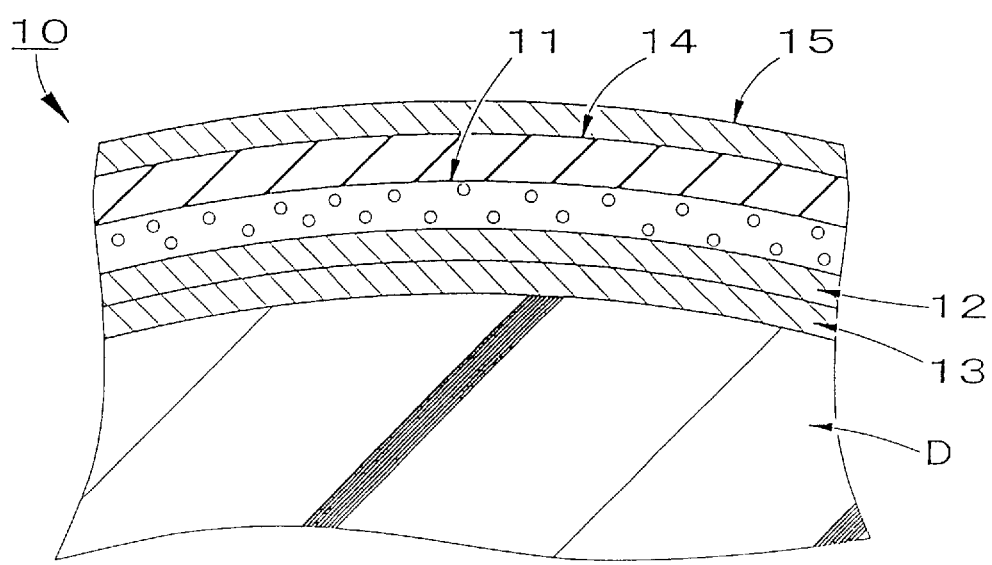
FIG. 3 is an enlarged sectional view of a portion of FIG. 2.

The material activating device 10 thus assembled is wound around an air duct D of a polymeric material for an automobile with the copper strips 12 and 13 in close contact with each other as shown in FIG. 2. The two copper strips 12 and 13 form a metal layer on the duct D, and the radioactive layer 11 is formed over the metal layer.

Radiation of an intensity on the order of 100 mSv emitted by the radioactive layer 11 ionizes intake air flowing through the duct D.

At the same time, the metal layer consisting of the copper strips 12 and 13 is charged with charges produced by the ionization of intake air and creates an electric field and a magnetic field. The electric field and the magnetic field thus created act on the ionized intake air to promote the activation of the intake air greatly.

The activated air is sucked into the cylinder of an automotive engine, not shown, and is mixed satisfactorily with the fuel injected into the cylinder. Consequently, the efficiency of combustion of the fuel in the cylinder can greatly be improved, fuel consumption rate can be improved, and the purification of the exhaust gas can be promoted.

The conductive metal layer and the radioactive layer can simultaneously be formed by winding the material activating device 10 in the first embodiment on the duct D of the automotive engine.

Since the material activating device 10 can be attached to the duct D simply by winding the same on the duct D, the material activating device 10 can easily be attached to the duct D regardless of the shape of the duct D.

Since the two copper strips 12 and 13 superposed so as to be slidable relative to each other form the metal layer, the rigidity of the metal layer do not make difficult the work for attaching the material activating device 10 to the duct D, and the metal layer can be formed in a sufficiently great thickness.

Since the material activating device 10 in the first embodiment is attached to the outer surface of the duct D, the material activating device 10 does not exert any resistance on the intake air being sucked into the engine.

Brass or steel strips may be used instead of the copper strips for forming the metal layer.

Second Embodiment

An material activating device 20 in a second embodiment according to the present invention will be described with reference to FIG. 4.

Figure 4:
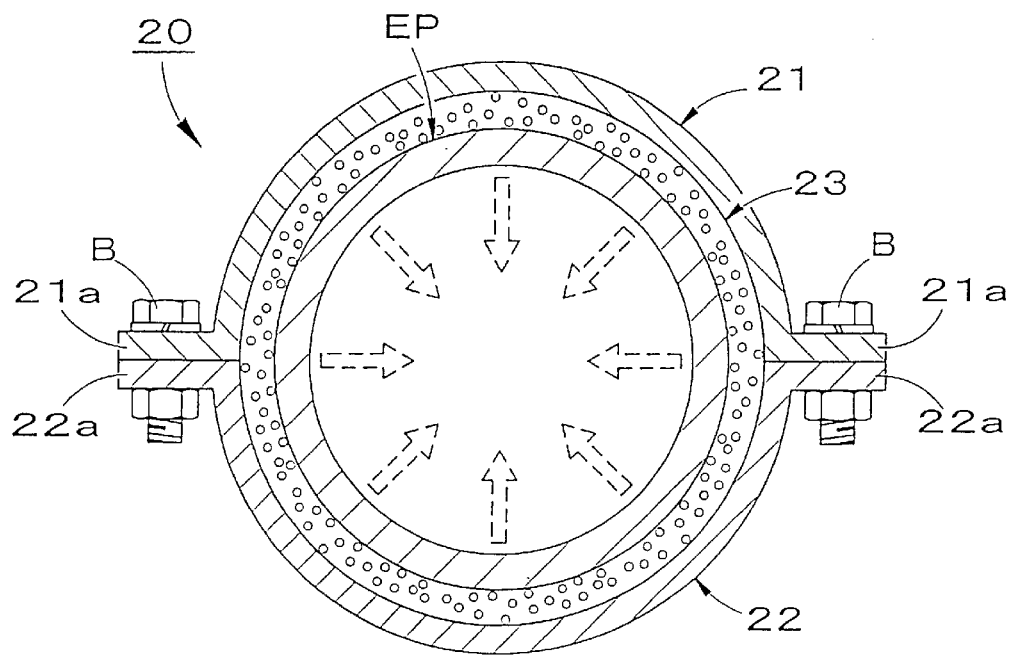
FIG. 4 is a sectional view of a material activating device in a second embodiment according to the present invention as mounted on an exhaust pipe.

Referring to FIG. 4, the material activating device 20 in the second embodiment employs the steel exhaust pipe EP, i.e., a conductive metal pipe, of an automobile as a conductive metal layer.

A pair of semicylindrical holding members 21 and 22 have flanges 21a and 22a, respectively. The holding members 21 and 22 are put on the exhaust pipe EP and the flanges 21a and 22athereof are fastened together with bolts B. A monazite powder layer 23, i.e., a radioactive layer, is sealed in a space defined by the holding members 21 and 22, and the exhaust pipe EP by a heat-resistant seal.

The effect of radioactive rays emitted by the monazite power layer 23 on the exhaust gas from an automotive engine flowing through the exhaust pipe EP is enhanced greatly by the exhaust pipe EP serving as the metal layer.

Chemical compounds including carbon monoxide, carbon dioxide and nitrogen oxide contained in the exhaust gas flowing through the exhaust pipe EP are ionized and are activated greatly by the electric field and the magnetic field created by the exhaust pipe EP serving as a conductive metal layer. The ionized and activated chemical compounds are converted efficiently by a catalytic converter and the exhaust gas is purified efficiently.

The material activating device 20 in the second embodiment uses the exhaust pipe EP of the automobile as the conductive metal layer and hence the original parts of the automobile need not be changed.

Since the radioactive layer 23 of the material activating device 20 in the second embodiment is disposed outside the exhaust pipe EP, the radioactive layer 23 is not exposed to the destructive action of the exhaust gas.

Naturally, the material activating device 20 in the second embodiment can be used not only in combination with the exhaust pipe EP of the automobile but also in combination with the intake duct of the automobile.

Third Embodiment

A material activating device 30 in a third embodiment according to the present invention will be described with reference to FIG. 5. The material activating device 30 can be used for activating both air for combustion and exhaust gas produced by combustion.

Figure 5:
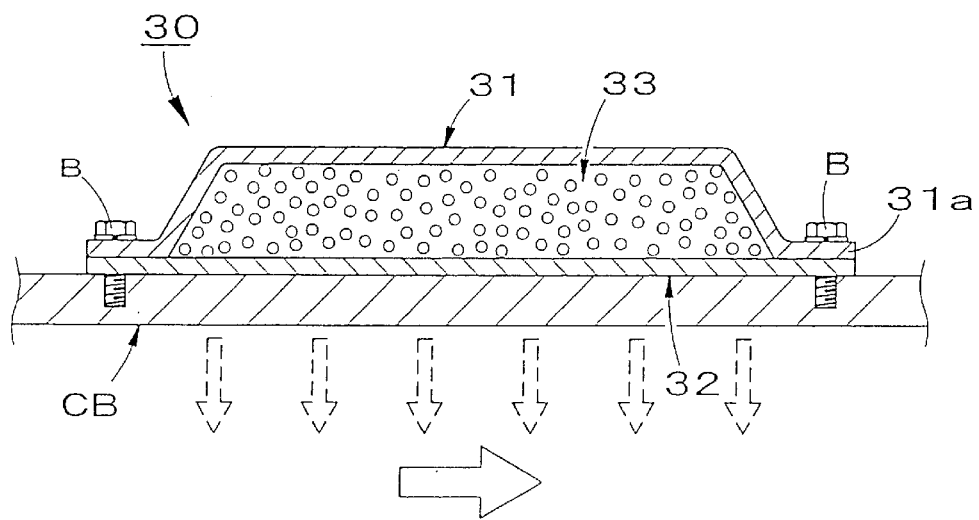
FIG. 5 is a sectional view of a material activating device in a third embodiment according to the present invention as mounted on an cylinder block.
Figure 6:
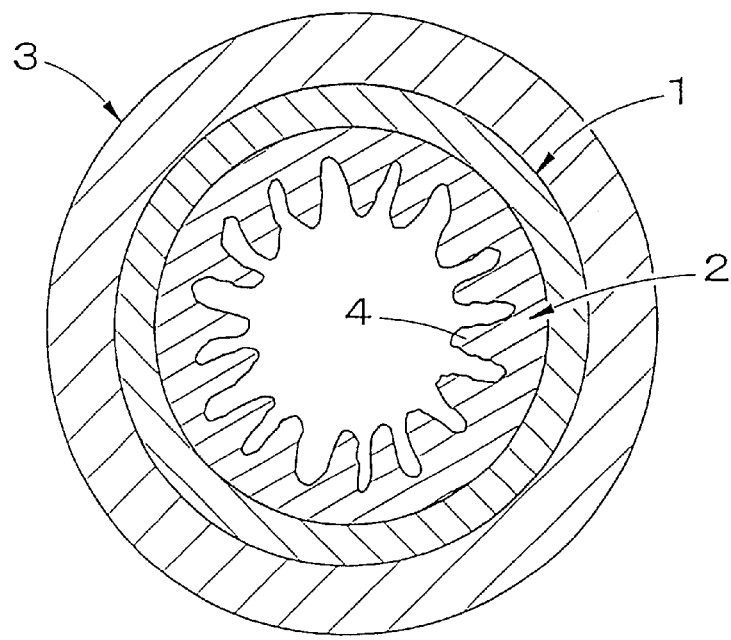
FIG. 6 is a material activating device disclosed in JP-A No. Sho 52-131024 as disposed in a carburetor for an automobile.
Figure 7:
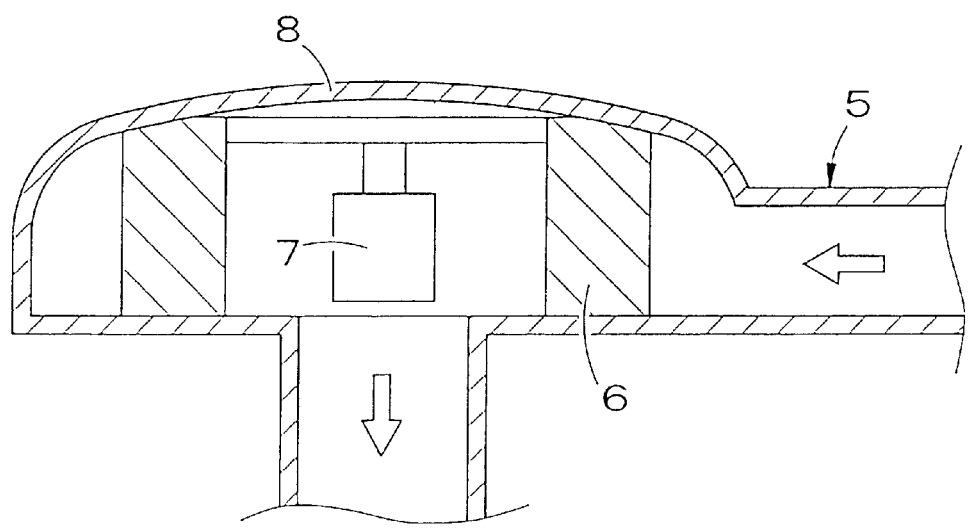
FIG. 7 is a material activating device disclosed in JP-A No. Sho 53-16118 as disposed inside an air cleaner for an automobile.

As shown in FIG. 5, the material activating device 30 in the third embodiment utilizes the cylinder block CB of an automotive engine as a conductive metal layer.

A set of holding members 31 and 32 are put on a surface of the cylinder block CB and are fastened to the cylinder block CB with bolts B. Monazite powder layer 33 is sealed in a space defined by the holding members 31 and 32. Preferably, the holding member 32 in contact with the cylinder block CB is formed of a conductive metal, such as steel.

The effect of radioactive rays emitted by the monazite power layer 33 is enhanced greatly by the cylinder block CB and the holding member 32. Therefore, intake air sucked by the automotive engine or the exhaust gas flowing through the cylinder block CB can efficiently be activated.

The material activating device 30 in the third embodiment uses the cylinder block CB of the automotive engine as the conductive metal layer and hence the original parts of the automobile need not be changed. Therefore, intake air sucked by the automotive engine or the exhaust gas flowing through the cylinder block CB can efficiently be activated. The radioactive material may be held in a hollow formed in the cylinder block CB instead of holding the same in the space defined by the holding members.

Fourth Embodiment

The material activating device in accordance with the present invention is applicable not only to activating intake air for the engine and the exhaust gas from the engine as mentioned above but also to activating various materials.

A material activating device in a fourth embodiment according to the present invention will be described as applied to activating air inflating a tire.

A general rubber tire for vehicles fits the rim of a metal wheel and is inflated by compressed air. The rubber tire exercises a cushioning action by the agency of the elasticity of rubber and air, and driving and braking actions by the agency of friction between the rubber tire and the road surface. Pressure is applied uniformly to the entire inner surface of the tire while the tire is stationary. A deformed flat contact portion in contact with the road surface of the tire move in a direction opposite the direction of rotation of the tire while the vehicle is traveling. Consequently, air flows in a space defined by the tire and the wheel in a direction opposite the direction of rotation of the tire. The flowing speed of the air increases as the rotating speed of the tire increases. Since the sectional area of the deformed flat contact portion of the tire is smaller than that of other portions not in contact with the road surface of the tire, the pressure difference between portions of the tire on the opposite sides of the deformed flat contact portion increases with the increase of the flowing speed of the air in the tire.

The pressure difference between the portions of the tire on the opposite sides of the deformed flat contact portion obstructs the recovering action of the deformed flat contact portion to recover its original shape, increases rolling resistance and can be one of the cause of standing waves. The center of gravity of the body of the vehicle shifts, and the sectional area of the deformed flat contact portion of the tire decreases further thereby further increasing the pressure difference between the portions of the tire on the opposite sides of the deformed flat contact portion when the vehicle travels along a curve. Consequently, the contact portion of the tire is further flattened. Although the resilience of the tire makes effort to adjust the air pressure difference in the tire, the resilience of the tire is unable to adjust the air pressure difference when the tire is rotating at a high rotating speed under a large load and, eventually, the tire bursts.

The level of tire noise generated by friction between the tire and the road when the tire rolls on the road rises according to the vertical load on the tire and the rotating speed of the tire. When the flattening of the deformed flat portion of the tire is enhanced, squeals are generated increasing tire noise.

The intensity of turbulence generated behind the tire when the vehicle travels at a high traveling speed of 120 km/h or above increases and air resistance increases when the flattening of the deformed flat portion of the tire is enhanced.

The material activating device in the fourth embodiment intended to solve those problems employs a wheel of a conductive metal holding a tire as a metal layer interposed between air inflating the tire and a radioactive means that generates radioactive rays for irradiating air inflating the tire.

Air inflating the tire is ionized by irradiation with radioactive rays and the ionized air flows smoothly in the tire. Consequently, the pressure difference between portions of the tire on the opposite sides of a deformed flat contact portion is reduced and the recovering action of the deformed flat contact portion to recover its original shape is not obstructed.

Accordingly, generation of standing waves, bursting of the tire rotating at a high rotating speed, generation of tire noise during high-speed traveling and increase of air resistance can be suppressed.

Since the cushioning effect of air inflating the tire increases when the same is ionized, microscopic rubbing between the tire and the road surface is reduced reducing the abrasion of the tire, and the dynamic stability of the vehicle is enhanced when lateral wind acts on the vehicle or when the vehicle is steered sharply.

Since the ionized air inflating the tire does not amplify tire noise and hence increase in tire noise can be suppressed.

Since the ionized air inflating the tire activates the rubber forming the tire continuously, the degradation of the tire can be prevented and the elasticity of the tire can be maintained for a long period of service.

Since the heat transfer coefficient of air increases when air is ionized, the ionized air inflating the tire enables the efficient dissipation of heat generated by the tire rolling on the road or by the braking action of a brake through the tire into the atmosphere.

Fifth Embodiment

A material activating device in a fifth embodiment according to the present invention will be described as applied to a shock absorber of a vehicle.

Generally, a shock absorber, i.e., a cushioning device, of a vehicle utilizes dampening force produced by restricting the flow of an oil or a high-pressure gas sealed in a cylinder by an orifice. Surfaces of different orifices are formed unavoidably in different levels of surface accuracy, respectively, due to inevitably varying processing conditions, and hence the quality of shock absorbing action could not have been improved.

The material activating device in the fifth embodiment intended to solve such problems employs a shock absorber housing of a conductive metal or a piston of a conductive metal provided with an orifice as a metal layer interposed between a working fluid, such as an oil or a high-pressure gas, sealed in the shock absorber cylinder of a shock absorber and a radioactive means that generates radioactive rays for irradiating the working fluid.

The material activating device in the fifth embodiment ionizes the oil or the high-pressure gas sealed in the shock absorber cylinder of the shock absorber to enable the oil or the high-pressure gas to flow smoothly through the orifice. Consequently, the oil or the high-pressure gas sealed in the shock absorber cylinder flows through the orifice smoothly even if the surface of the orifice is not finished in a proper accuracy, so that the shock absorber is capable of improved shock absorbing performance.

The elasticity and durability of the oil or the high-pressure gas is improved when the oil or the high-pressure gas is ionized and, therefore, the shock absorber is able to exercise satisfactory shock absorbing function for a long period of service.

When a conductive metal layer and the radioactive means are disposed so as to surround a rubber bushing attached to a portion attached to the body of a vehicle of the shock absorber, the elasticity of the rubber bushing can be improved, the deterioration of the rubber bushing can be prevented and the shock absorbing effect of the shock absorber can further be enhanced.

Sixth Embodiment

A material activating device in a sixth embodiment according to the present invention will be explained as applied to a lubricator for lubricating sliding parts of a machine.

A synthetic lubricating oil is used to reduce friction between metal parts in relative sliding motion of a machine. Heat and metal powder produced by abrasion affect the quality of the lubricating oil adversely, causing the gradual reduction of the lubricating and heat exchanging abilities of the lubricating oil. If metal powder produced by the abrasion of metal parts is accumulated in an oil filter, the oil filtering ability of the oil filter declines and lubricating ability declines.

The material activating device in the sixth embodiment intended to solve such problems employs a vessel of a conductive metal containing a lubricating oil or a pipe of a conductive metal through which a lubricating oil flows as a metal layer interposed between a lubricating oil for lubricating sliding parts of a machine and a radioactive means that generates radioactive rays for irradiating the lubricating oil.

The material activating device in the sixth embodiment ionizes the lubricating oil efficiently to form a firm film of the lubricating oil over the surfaces of the lubricated metal parts. Consequently, particles of a metal element, such as molybdenum, dispersed in the lubricating oil can be spread with reliability over the surfaces of the lubricated metal parts, the lubricating and heat exchanging abilities of the lubricating oil can remarkably be improved and the life of the machine can be extended.

Since the ionized lubricating oil is able to flow smoothly through a layer of metal particles produced by abrasion and deposited on the oil filter, the ability of the oil filter can be maintained, the lubricating performance can be improved, load on the oil pump can be reduced and power loss can be reduced.

Seventh Embodiment

A material activating device in a seventh embodiment according to the present invention will be described as applied to cooling a cooling liquid for cooling a part that generates heat of a machine.

For example, in an engine, a cooling liquid is circulated under pressure to dissipate heat generated by combustion efficiently from the cylinder block of the engine. When the cooling liquid is circulated under pressure, load on the pump increases and it is possible that the cooling liquid leaks from joints of pipes and the like and breaks the hose.

The material activating device in the seventh embodiment intended to solve such problems employs a pipe of a conductive metal through which a cooling liquid flows or a vessel of a conductive metal containing a cooling liquid as a metal layer interposed between the cooling liquid for cooling a parts that generates heat of a machine and a radioactive means that generates radioactive rays for irradiating the cooling liquid.

The material activating device in the seventh embodiment ionizes the cooling liquid and forms a film of the ionized cooling liquid on the inner surfaces of the component members of a cooling liquid circulating system. Consequently, heat transfer coefficient is increased, cooling efficiency is improved, the cooling liquid flows smoothly in a laminar flow and resistance against the flow of the cooling liquid is reduced. Since the pressure necessary for circulating the cooling liquid can be lowered, load on the pump and power loss can be reduced, leakage of the cooling liquid from the joints of pipes and the like and the breakage of the hose can be prevented. The layer of the ionized cooling liquid protects the component members of the cooling liquid circulating system from corrosion, and prevents the deterioration of rubber hoses and the like.

Eighth Embodiment

A material activating device in an eighth embodiment according to the present invention will be described as applied to a liquid fuel supply system for supplying a liquid fuel to, for example, a combustion engine.

In general combustion, a fuel gas produced by gasifying a liquid fuel and oxygen interact in a combustion chamber to generate thermal energy. The fuel and air must be mixed uniformly to generate energy efficiently from the liquid fuel.

With such an object in view, the material activating device in the eighth embodiment employs a liquid fuel container of a conductive metal or a pipe of a conductive metal through which a liquid fuel flows as a metal layer interposed between the liquid fuel to be supplied to a combustion engine and a radioactive means that generates radioactive rays for irradiating the liquid fuel.

The material activating device in the eighth embodiment ionizes a liquid fuel, such as gasoline or light oil. The ionized liquid fuel can be atomized by jetting the same through a fuel injection valve in liquid fuel particles of a particle size far smaller than that in which the liquid fuel particles are jetted when the liquid fuel is not ionized. Consequently, the liquid fuel and air can satisfactorily be mixed in the combustion chamber and it is possible to make most of the thermal energy of the liquid fuel.

The material activating device in the eighth embodiment can be used not only for ionizing gasoline and light oil but also for ionizing a gas fuel, such as propane gas.

Ninth Embodiment

A material activating device in a ninth embodiment according to the present invention will be described as applied to an exhaust gas purifying system for purifying the exhaust gas from an engine.

The exhaust gas discharged from an engine contains carbon monoxide, carbon dioxide and hydrocarbons. The hydrocarbons can be converted into water and carbon dioxide by perfect combustion and water and carbon dioxide thus produced can be discharged into the atmosphere. However, since the perfect combustion of the hydrocarbons is physically difficult, various exhaust gas purifying systems employing a catalytic converter or the like must be used.

The catalytic converter or the like exerts resistance against the flow of the exhaust gas discharged from the cylinder of an internal combustion engine and hence the exhaust gas is unable to flow smoothly, and back pressure increases to obstruct the rise of output.

The material activating device in the ninth embodiment intended to solve such problems employs a member of a conductive metal of an exhaust gas purifying system as a metal layer interposed between the exhaust gas from the combustion engine and a radioactive means that generates radioactive rays for irradiating the exhaust gas.

The material activating device in the ninth embodiment ionizes the exhaust gas that comes into contact with surface of the metal member of the exhaust gas purifying system to achieve an efficient exhaust gas purifying action. Since the ionized exhaust is able to flow smoothly through the exhaust gas purifying system regardless of the resistance of the catalytic converter against the flow of the same.

The ionized exhaust gas prevents the corrosion of the component parts of the exhaust gas purifying system.

Tenth Embodiment

A material activating device in a tenth embodiment according to the present invention will be described as applied to activating a fluid that flows through a turbine.

Water, steam and an operating fluid are used in hydraulic power generation, thermal power generation and an automotive automatic transmission, respectively, as a working fluid that is applied to turbine blades for generating rotary driving force. The resistance of the turbine blades against the flow of the fluid increases with the increase of the velocity of the fluid and hence the ability of the fluid to transfer its energy to the turbine blades is reduced.

The material activating device in the tenth embodiment intended to solve such a problem employs turbine blades of a conductive metal or a turbine casing housing the turbine blades therein as a metal layer interposed between a working fluid flowing into the turbine and a radioactive means that generates radioactive rays for irradiating the working fluid. More concretely, the radioactive means is placed in hollows formed in the moving blades or the stationary blades of the turbine.

The material activating device in the tenth embodiment ionizes the working fluid flowing into the turbine the moment the working fluid comes into contact with the moving blades or the stationary blades of the turbine. The ionized working fluid forms laminar flows on the surfaces of the moving blades or the stationary blades, and flows smoothly through spaces between the turbine blades, so that the energy of the working fluid can be converted into rotary driving force at a high conversion efficiency.

Eleventh Embodiment

A material activating device in an eleventh embodiment according to the present invention will be described as incorporated into a sliding bearing.

Oil-lubricated sliding bearings are classified into those of a hydrodynamic lubrication type and those of a hydrostatic lubrication type. In the hydrodynamic lubrication type sliding bearing, a pressure (dynamic pressure) is generated in a lubricating fluid film formed in a bearing clearance by the sliding motions of a shaft and the bearing relative to each other to bear load by the pressure. However, the hydrodynamic lubrication type sliding bearing, the dynamic pressure rises with the rise of the rotating speed of the shaft and, consequently, bearing resistance increases as the rotating speed of the shaft rises and, eventually, small vibrations are generated.

The material activating device in the eleventh embodiment intended to solve such problems uses a bearing member of a sliding bearing of a conductive metal or a rotating shaft as a metal layer interposed between a lubricating oil film confined in a bearing clearance of the sliding bearing and a radioactive means that generates radioactive rays for irradiating the lubricating oil. More concretely, the radioactive means is contained in a hollow formed in the bearing member of the sliding bearing or the rotating shaft.

The material activating device in the eleventh embodiment ionizes lubricating oil filling up the bearing clearance. Films of the ionized lubricating oil adhere closely to the surfaces of the bearing metal and the rotating shaft and the lubricating oil is able to flow smoothly. Thus, bearing resistance during the high-speed rotation of the rotating shaft is reduced and the generation of small vibrations can be prevented.

Since the surfaces of the metal rotating shaft and the metal bearing member can be lubricated with reliability during the high-speed rotation of the rotating shaft, the abrasion of the sliding bearing can be reduced.

The material activating device in the eleventh embodiment is applicable also to the transmission and the differential gear of an automobile.

Twelfth Embodiment

A material activating device in a twelfth embodiment according to the present invention will be described as applied to a cooling system, such as an air conditioner.

A cooling system, for example, for an air conditioner or a refrigerator evaporates a refrigerant in an evaporator to absorb heat from air in a room or a refrigerator, compresses the refrigerant in a condenser to discharge heat outside through a radiator. Accordingly, it is necessary to improve the heat exchanging efficiency of the refrigerant in the evaporator to improve the cooling ability of the refrigerator or the air conditioner.

The material activating device in the twelfth embodiment intended to solve such a problem employs the evaporator of a conductive metal of a cooling system as a metal layer interposed between the refrigerant and a radioactive means for radiating radioactive rays for irradiating the refrigerant.

The material activating device in the twelfth embodiment ionizes the refrigerant in the evaporator, so that a film of the ionized refrigerant is formed in close contact with the inner surface of the metal evaporator. Consequently, heat exchanging efficiency between the surface of the metal evaporator and the refrigerant can greatly be improved.

Thirteenth Embodiment

A material activating device in a thirteenth embodiment according to the present invention will be described as applied to improving wash water.

For example, tap water is used in general homes as a solvent for dissolving a detergent. Warm water must inevitably be used to enhance the detergency of the detergent, which requires an additional expense for energy.

The material activating device in the thirteenth embodiment intended to solve such a problem employs a wash water container of a conductive metal or a pipe of a conductive metal through which wash water flows as a metal layer interposed between wash water and a radioactive means that generates radioactive rays for irradiating wash water.

The material activating device in the thirteenth embodiment is capable of efficiently ionizing tap water for use as wash water. A surface active agent, i.e., a detergent, dissolved in the ionized tap water displays activity efficiently even at an ordinary temperature, so that the ability of the surface active agent in washing tableware and laundry can greatly be enhanced. The ionized tap water prevents the corrosion of inner surfaces of water supply pipes.

Fourteenth Embodiment

A material activating device in a fourteenth embodiment according to the present invention will be described as incorporated into the bottom of a ship.

The bottom of a ship needs to be cleared periodically of phytoplankton and shellfishes adhering thereto to reduce frictional resistance of water against the cruising of the ship, which requires much time and labor.

The material activating device in the fourteenth embodiment intended to solve such a problem employs the bottom of a conductive metal of a ship as a metal layer interposed between water in which the ship is floating and a radioactive means that generates radioactive rays for irradiating water.

The material activating device in the fourteenth embodiment forms a film of ionized water over the surface of the bottom of a ship and the film of ionized water the adhesion of phytoplankton and shellfishes adhering to the bottom of the ship, so that the phytoplankton and shellfishes adhering to the bottom of the ship can easily be removed off the bottom of the ship by the pressure of water generated by the cruising ship. Since the surface of the bottom of the ship is coated closely with the film of ionized water, frictional resistance exerted by water on the cruising ship can be reduced.

Fifteenth Embodiment

A material activating device in a fifteenth embodiment according to the present invention will be described as incorporated into an aircraft.

An anti-icing system using electric heaters or hot air is installed in the front edge of the main wing of an aircraft to prevent ice accretion to the wing by the freezing of moisture contained in the atmosphere. However, if a high-lift device, such as a leading-edge slat for increasing lift while the aircraft is in landing flight or take-off flight, is installed in the leading edge of the main wing, it is difficult to install wiring for the electric heaters or piping for the hot air on the main wing.

The material activating device in the fifteenth embodiment employs a wing panel of a conductive metal as a metal layer interposed between ice accreted to the surface of the main wing of an aircraft and a radioactive means that generates radioactive rays for irradiating the ice.

The material activating device in the fifteenth embodiment ionizes and melts a layer in close contact with the surface of the main wing of the ice accreted to the main wing, so that the ice accreted to the main wing can easily be removed from the main wing by wind pressure that acts on the ice while the aircraft is in flight.

Since the material activating device in the fifteenth embodiment does not need any electrical wiring and any piping for hot air at all, the material activating device can easily be incorporated into the leading edge of a main wing even if a high-lift device, such as a front-edge slat, is incorporated into the main wing.

Since a film of ionized air is formed in close contact with the surface of the main wing provided with the material activating device in the fifteenth embodiment, air flows in a laminar flow along the surface of the main wing, air resistance on the main wing is reduced and icing on the main wing can be prevented.

Sixteenth Embodiment

A material activating device in a sixteenth embodiment according to the present invention will be described as applied growing plants.

Water containing nourishment is necessary in addition to sunshine and carbon dioxide contained in the atmosphere to grow plants. The amount of water absorbed through roots of plants must be increased to promote the growth of the plants. A usual growth promoting technique that raises the temperature of water to be absorbed by plants is merely able to increase the amount of water absorbed by plants to some extent.

The material activating device in the sixteenth embodiment intended to solve such a problem employs a water container of a conductive metal or a pipe of a conductive metal through which water flows as a metal layer interposed between nourishing water to be supplied to plants and a radioactive means that generates radioactive rays for irradiating the nourishing water.

The material activating device in the sixteenth embodiment ionizes water for watering plants and nourishment contained in the water. The ionized water and the ionized nourishment can easily be absorbed by the roots of plants thereby promoting the growth of the plants.

Nitrogenous substances essential to the growth of plants are produced when leaf mould is decomposed by bacteria and enzymes. Ionized water ionized by the material activating device in the sixteenth embodiment promotes the production of nitrogenous substances through the decomposition of leaf mould. The ionized water containing dissolved nitrogenous substances in a high concentration promotes the growth of plants greatly.

Seventeenth Embodiment

A material activating device in a seventeenth embodiment according to the present invention will be described as applied to a purifier.

For example, a purifier for purifying human wastes discharged from general homes oxidizes and decomposes organic substances by aerobic bacteria and oxygen contained in the atmosphere. Therefore, it is possible to process human wastes efficiently by propagating such aerobic bacteria.

The material activating device in the seventeenth embodiment intended to solve such a problem employs an aerating air supply pump of a conductive metal or a pipe of a conductive metal through which aerating air flows as a metal layer interposed between aerating air supplied into a sewage purifier and a radioactive means that generates radioactive rays for irradiating the aerating air.

The material activating device in the seventeenth embodiment enables the supply of ionized air into the purifier, whereby aerobic bacteria capable of decomposing human wastes are activated and sewage can more efficiently be treated.

Eighteenth Embodiment

A material activating device in an eighteenth embodiment according to the present invention will be described as incorporated into a spraying system.

For example, a coating material must be atomized and dispersed in smaller particles when coating the surface of an automotive body with the coating material in higher uniformity and better coating quality. However, it is difficult to atomize a coating material in smaller particles by the conventional spraying system because the conventional spray system uses air directly for atomizing and dispersing the coating material.

The material activating device in the eighteenth embodiment intended to solve such a problem employs an air compressor of a conductive metal or a pipe of a conductive metal through which compressed air flows as a metal layer interposed between compressed air for atomizing and spraying a coating material and a radioactive means that generates radioactive rays for irradiating the compressed air.

When a coating material is atomized by ionized air ionized by the material activating device in the eighteenth embodiment, the mixing of air and the coating material is promoted and the coating material can be atomized in smaller particles. Thus, the spray system employing the material activating device in the eighteenth embodiment is capable of forming a coating layer of higher uniformity and higher quality.

Nineteenth Embodiment

A material activating device in a nineteenth embodiment according to the present invention will be described as incorporated into an acoustic speaker.

A speaker cone of an acoustic speaker is electrically driven for vibration to vibrate air for sound generation. Since the conventional speaker vibrates air surrounding the speaker directly, the material forming the speaker cone is selectively determined and various efforts are made to generate clearer sounds.

The material activating device in the nineteenth embodiment employs a speaker holding member of a conductive material or a housing of a conductive metal for housing a speaker as a metal layer interposed between air surrounding the speaker cone of the speaker and a radioactive means that generates radioactive rays for irradiating the air surrounding the speaker cone.

The material activating device in the nineteenth embodiment ionizes the air surrounding the speaker cone. Consequently, the speaker provides clearer acoustic effect, the deterioration of the speaker cone can be prevented, and the speaker is able to maintain excellent acoustic effect for a long period of service.

What is claimed is:

1. A material activating device having a laminated structure capable of being wound around a duct through which a material to be activated flows comprising:

a plurality of laminated conductive metal strips disposed on each other;

a strip of a laminated radioactive substance for generating radioactive rays for irradiating the material, said strip disposed between the plurality of conductive metal strips; and combining means for combining together said laminated conductive metal strips and said strip of a laminated radioactive substance so as to be slidably disposed relative to each other;

wherein the laminated conductive metal strips situated between said strip of a radioactive substance and said duct form a conductive metal layer when the device is wound around the duct.

2. The material activating device according to claim 1, wherein the number of laminated conductive metal strips situated between said strip of a laminated radioactive substance and said duct is larger than the number of said conductive metal strips situated exterior to said strip of a laminated radioactive substance, when the device is wound around the duct.

3. The material activating device according to claim 1, further comprising a laminated lead strip for intercepting the radioactive rays, said laminated lead strip located between said conductive metal strips situated exterior to said strip of a laminated radioactive substance and said strip of a radioactive substance when the device is wound around the duct.

4. The material activating device according to claim 1, wherein said conductive metal strips are made of copper.

5. The material activating device according to claim 1, wherein said combining means is a rivet.

6. The material activating device according to claim 1, wherein said duct is an air intake duct for an automobile engine made of polymeric material.

* * * * *